United States Patent [19]
Gabbay

[11] Patent Number: 5,981,066
[45] Date of Patent: Nov. 9, 1999

[54] APPLICATIONS OF METALLIZED TEXTILE

[75] Inventor: Jeffrey Gabbay, Jerusalem, Israel

[73] Assignee: MTC Ltd., Jerusalem, Israel

[21] Appl. No.: 08/693,657

[22] Filed: Aug. 9, 1996

[51] Int. Cl.$^6$ ............... B32B 9/00; B05D 3/04; D03D 3/00

[52] U.S. Cl. .......... 428/389; 428/375; 428/379; 427/304; 427/383.1; 5/495; 442/6; 442/229; 442/231; 442/316; 442/317

[58] Field of Search ............ 428/389, 329, 428/375; 5/495; 427/304, 383.1; 442/6, 52, 229, 230, 231, 316, 317, 327, 329; 424/403, 404, 405

[56] References Cited

U.S. PATENT DOCUMENTS

| | | | |
|---|---|---|---|
| 252,524 | 1/1882 | Sagendorf . | |
| 1,210,375 | 12/1916 | Decker . | |
| 3,308,488 | 3/1967 | Schoonman . | |
| 3,385,915 | 5/1968 | Hamling . | |
| 3,663,182 | 5/1972 | Hamling . | |
| 3,769,060 | 10/1973 | Ida et al. . | |
| 3,860,529 | 1/1975 | Hamling . | |
| 4,072,784 | 2/1978 | Cirinet . | |
| 4,103,450 | 8/1978 | Whitcomb . | |
| 4,115,422 | 9/1978 | Welch et al. . | |
| 4,174,418 | 11/1979 | Welch et al. . | |
| 4,219,602 | 8/1980 | Conklin . | |
| 4,291,086 | 9/1981 | Auten . | |
| 4,292,882 | 10/1981 | Clausen . | |
| 4,317,856 | 3/1982 | Huthelker et al. . | |
| 4,366,202 | 12/1982 | Borovsky . | |
| 4,390,585 | 6/1983 | Holden . | |
| 4,525,410 | 6/1985 | Hagiwara . | |
| 4,666,940 | 5/1987 | Bischoff et al. . | |
| 4,769,275 | 9/1988 | Inagaki et al. . | |
| 4,853,019 | 8/1989 | White et al. . | |
| 4,900,618 | 2/1990 | O'Connor et al. | 428/389 |
| 4,900,765 | 2/1990 | Murabayashi et al. . | |
| 4,983,573 | 1/1991 | Bolt et al. . | |
| 4,999,240 | 3/1991 | Brotz | 428/389 |
| 5,009,946 | 4/1991 | Hatomoto et al. . | |
| 5,017,420 | 5/1991 | Marikar et al. | 428/389 |
| 5,024,875 | 6/1991 | Hill et al. . | |
| 5,066,538 | 11/1991 | Huykman | 428/389 |
| 5,143,769 | 9/1992 | Moriya et al. . | |
| 5,175,040 | 12/1992 | Harpell et al. . | |
| 5,200,256 | 4/1993 | Dunbar . | |
| 5,227,365 | 7/1993 | Van Den Sype . | |
| 5,254,134 | 10/1993 | Zhao et al. . | |
| 5,269,973 | 12/1993 | Takahashi et al. | 428/389 |
| 5,316,846 | 5/1994 | Pinsky et al. | 428/389 |
| 5,370,934 | 12/1994 | Burch et al. | 428/389 |
| 5,399,425 | 3/1995 | Burch | 428/389 |
| 5,405,644 | 4/1995 | Ohsumi et al. | 428/389 |
| 5,407,743 | 4/1995 | Clough et al. | 428/389 |
| 5,411,795 | 5/1995 | Silverman | 428/389 |
| 5,518,812 | 5/1996 | Mitchnick et al. . | |
| 5,547,610 | 8/1996 | Mortenson | 428/389 |
| 5,549,972 | 8/1996 | Hsu et al. | 428/389 |
| 5,871,816 | 2/1999 | Tal | 427/304 |

OTHER PUBLICATIONS

"Encyclopedia of Polymer Science and Technology", John Wiley & Sons, Inc., vol. 8, pp. 651–666 and vol. 9, pp. 580–598, 1968 (no month).

Marino, A. et al, "Electrochemical Properties of Silver–Nylon Fabrics", J. Electrochem. Soc. vol. 132, No. 1, pp. 68–72, (Jan. 1985).

*Primary Examiner*—William Krynski
*Assistant Examiner*—J. M. Gray
*Attorney, Agent, or Firm*—Mark M. Friedman

[57] ABSTRACT

Applications of a metallized textile. The textile is activated by precipitating noble metal nucleation sites on the fibers of the textile. Immersing the activated textile in a suitably prepared solution of a metal cation, and adding a reducing agent, leads to the formation of a metal plating tightly and intimately bonded to the fibers of the textile. Exposure of the metallized textile to air oxidizes the surface of the metal plating. Applications of the metallized textile include acaricides, fungicides, bactericides, armor, electrodes, antistatic devices, RF shielding, and radar reflectors.

11 Claims, No Drawings

APPLICATIONS OF METALLIZED TEXTILE

FIELD AND BACKGROUND OF THE INVENTION

The present invention relates to textiles and, more particularly, to applications of a metallized textile produced by binding a full or partial metal or metal oxide plating to the fibers of a textile.

There are a variety of applications for which a textile with a full or partial metal or metal oxide plating bonded to the fibers thereof would be useful. These include:

1. Acaricide

Beds commonly are infested by tiny mites. These mites eat bacteria and fungi that grow on epidermal scales shed by people who sleep in the beds. Fragments of dead mites, and mite excreta, are allergens, to which asthmatics and people with dust allergens are sensitive. I have found that some metals and metal oxides, notably Cu, CuO, Ag and $Ag_2O$, repel mites.

The conventional method for making textiles inhospitable to mites is to treat the textiles with an organic acaricide such as benzyl benzoate. For example, Bischoff et al., in U.S. Pat. No. 4,666,940, teach an acaricide that includes benzyl benzoate and a solid powder carrier whose particles are of a size suitable for ingestion by the mites. These acaricides must be replaced every time the textile is laundered. Thus, Bischoff et al. recommend using their acaricide on textiles, such as carpets and upholstery, that are not laundered frequently. An inherently acaricidal bedsheet would keep a bed free of mites, even after multiple launderings, without the need to reapply acaricide to the bedsheet.

2. Bactericide and Fungicide

Some metal oxides, notably ZnO, are well known as furgicides. Before the introduction of antibiotics to medicine, silver metal sometimes was used as a bactericide and bacteriostat. Textiles with inherent bactericidal and fungicidal properties have obvious applications in settings, such as hospitals and similar institutions, where it is important to maintain aseptic conditions.

Bactericidal agents used heretofore in textiles include complexes of zirconyl acetate with inorganic peroxides (Welch et al., U.S. Pat. No. 4,115,422), metal cations contained in zeolite particles (Hagiwara et al., U.S. Pat. No. 4,525,410), and quaternary ammonium salts (White et al., U.S. Pat. No. 4,835,019; Hill et al., U.S. Pat. No. 5,024,875; Zhao et al., U.S. Pat. No. 5,254,134). These are not totally satisfactory, being specific to a particular textile (such as the polyamide yarn of White et al.), or being subject to eventual loss of activity by chemical decomposition, a process often hastened by laundering.

3. Body Armor

Lightweight armor commonly is made of multiple layers of fibers such as the fiber produced by E. I. DuPont de Nemours and Company under the trademark Kevlar. It has been found that the effectiveness of Kevlar armor is enhanced by the inclusion of ceramics such as $Al_2O_3$, in the form of plates, or, as taught by Clausen in U.S. Pat. No. 4,292,882, in the form of particles interspersed among the Kevlar fibers. These ceramics enhance the resistance of the armor to penetration by bullets, by abrading and gripping the bullets. This action would be enhanced further in armor in which the $Al_2O_3$ has an even more intimate connection to the Kevlar fibers.

The methods known in the prior art for bonding a metal or a metal oxide to a textile generally require that the metal or its oxide be bonded indirectly to the textile. For example, the metal may be reduced to a powder and suspended in a binder. The binder-metal mixture then is applied to the textile, with the binder, and not the metal, bonding to the textile. Alternatively, the metal is reduced to a powder, an adhesive is applied to the textile, and the metal powder is spread on the adhesive. Examples of both such methods may be found in U.S. Pat. No. 1,210,375, assigned to Decker. These methods are less than satisfactory for the above applications, for at least two reasons. First, the carrier or adhesive may entirely encapsulate the metal or metal oxide powder particles, inhibiting their contact with mites, fungi, and bacteria, and making the textile useless as an acaricide, fungicide, or bactericide. Second, multiple launderings tends to weaken the binder or adhesive and loosen or remove the particles.

Two notable exceptions to the general rule that metals and metal oxides have not heretofore been bonded directly to textiles are nylon textiles and polyester textiles, which may be plated with metals using standard electroless plating processes for plating plastics. The specific electroless plating methods known to the art are restricted in their applicability to only certain plastics, however. In particular, then are not suited to natural fibers, nor to most synthetic fibers.

There is thus a widely recognized need for, and it would be highly advantageous to have, a textile with a full or partial metal or metal oxide plating directly and securely bonded to the fibers thereof, for use in the applications listed above. The scope of the present invention includes these and other applications, which are listed below.

SUMMARY OF THE INVENTION

According to the present invention there is provided a process comprising the steps of: (a) providing a metallized textile, the metallized textile comprising: (i) a textile including fibers selected from the group consisting of natural fibers, synthetic cellulosic fibers, regenerated fibers, acrylic fibers, polyolefin fibers, polyurethane fibers, vinyl fibers, and blends thereof, and (ii) a plating including materials selected from the group consisting of metals and metal oxides, the metallized textile characterized in that the plating is bonded directly to the fibers; and (b) incorporating the metallized textile in an article of manufacture.

In the context of the present invention the term "textile" includes fibers, whether natural (for example, cotton, silk, wool, and linen) or synthetic, yarns spun from those fibers, and woven, knit, and non-woven fabrics made of those yarns. The scope of the present invention includes all natural fibers; and all synthetic fibers used in textile applications, including but not limited to synthetic cellulosic fibers (i.e., regenerated cellulose fibers such as rayon, and cellulose derivative fibers such as acetate fibers), regenerated protein fibers, acrylic fibers, polyolefin fibers, polyurethane fibers, and vinyl fibers, but excluding nylon and polyester fibers; and blends thereof.

The present invention comprises applications of the products of an adaptation of technology used in the electroless plating of plastics, particularly printed circuit boards made of plastic, with metals. See, for example, Encyclopedia of Polymer Science and Engineering (Jacqueline I. Kroschwitz, editor), Wiley and Sons, 1987, vol. IX, pp 580–598. As applied to textiles, this process includes two steps. The first step is the activation of the textile by precipitating catalytic noble metal nucleation sites on the textile. This is done by first soaking the textile in a solution of a low-oxidation-state reductant cation, and then soaking the textile in a solution of noble metal cations, preferably a solution of $Pd^{++}$ cations, most preferably an acidic $PdCl_2$ solution. The low-oxidation-state cation reduces the noble metal cations to the noble metals themselves, while being oxidized to a higher oxidation state. Preferably, the reductant cation is one that is soluble in both the initial low oxidation state and the final high oxidation state, for example $Sn^{++}$, which is oxidized to $Sn^{++++}$, or $Ti^{+++}$, which is oxidized to $Ti^{++++}$.

The second step is the reduction, in close proximity to the activated textile, of a metal cation whose reduction is catalyzed by a noble metal. Examples of such cations include $Cu^{++}$, $Ag^+$, $Zn^{++}$ and $Ni^{++}$. The reducing agents used to reduce the cations typically are molecular species, for example, formaldehyde in the case of $Cu^{++}$, and hydrazine hydrate in the case of $Ag^{+++}$. Because the reducing agents are oxidized, the metal cations are termed "oxidant cations" herein. After these oxidant cations are plated on the textile, the metal plating may be processed further, for example, by oxidation to the oxide. This oxidation is most conveniently effected simply by exposing the metallized textile to air. The metallized textiles and the oxide-plated textiles thus produced are characterized in that their metal or metal oxide plating is bonded directly to the textile fibers. The plating may cover substantially all of the fiber surfaces, or may cover only part of the surfaces.

As bactericides and fungicides, the metallized textiles thus produced have a variety of applications. They may be used to make garments, such as socks, which inhibit infections such as athletes foot and jock itch. They may be used to make intrinsically antiseptic bandages. They may be used in interior furnishings, such as floor coverings including carpets, wall coverings, curtains, and upholstered furniture: in hospitals, where they inhibit the spread of nosocomial infections, and as interior furnishings generally in warm, humid climates to inhibit mildew. They may be incorporated in food storage containers to lengthen the shelf life of the food stored therein.

Because the metallized textiles thus produced conduct electricity, they have a variety of electrical applications that exploit their flexibility and relatively light weight compared to fabrics woven from pure metals. They may be used as electrodes in applications, such as medical applications, in which flexibility, to match the contours of a patient's body, is an advantage. Similarly, they may be used as electrodes in lightweight batteries. They may be used as anti-static devices: for example, in carpets, to prevent static buildup in rooms where electronic devices sensitive to static, such as computers, are used; or in automotive upholstery, as taught by Hatomoto et al. in U.S. Pat. No. 5,009,946. They may be used as radio frequency shields to prevent eavesdropping on cordless telephone conversations or on stray electronic signals generally. In this application, they are aesthetically more pleasing than the metallic screens conventionally used for this purpose. They may be used in radar-reflective camouflage nets.

Finally, the textiles thus produced may be used as fire retardants, for example in fire barriers, garments, and public transportation vehicles.

DESCRIPTION OF THE PREFERRED EMBODIMENTS

The present invention is of applications of metallized textiles produced by binding a full or partial metallic plating to a textile. Specifically, the various applications that comprise the present invention employ textiles with metal and metal oxide coatings intimately and permanently bonded to the fibers of those textiles.

The process of plating a textile with a metal or metal oxide for use in the applications of the present invention may be better understood with reference to the following Examples. These Examples are illustrative, and should not be construed to restrict the scope of the present invention in any way.

EXAMPLE 1

A dilute acidic solution of $SnCl_2$ was prepared by dissolving $SnCl_2$ and concentrated HCl in water.

An dilute acidic solution of $PdCl_2$ was prepared by dissolving $PdCl_2$ and concentrated HCl, and water.

An 8"×3" cotton swatch was activated as follows:

Soak in a bath of the $SnCl_2$ solution.

Soak in a bath of the $PdCl_2$ solution.

A dilute basic $CuSO_4$ solution was prepared by dissolving $CuSO_4$ and NaOH (in approximately equal weight proportions), a chelating agent, and polyethylene glycol in water.

The activated cotton swatch and formaldehyde were added to the $CUSO_4$ solution under a pure oxygen atmosphere. After between 2 minutes and 10 minutes, the cotton swatch was removed.

The palladium deposited on the cotton swatch in the activation step catalyzed the reduction of the $Cu^{++}$ by the formaldehyde, providing a layer of copper tightly and intimately bonded to the fibers of the cotton swatch. The swatch, which initially was white in color, now was the color of copper metal, while retaining the flexibility and physical characteristics of the original fabric. The metallic copper color remained unchanged after several launderings.

EXAMPLE 2

An 8"×3" cotton swatch was activated as in Example 1. A dilute solution of $AgNO_3$ was prepared by dissolving $AgNO_3$, concentrated $NH_4OH$, and glacial acetic acid in water. The volume ratio of concentrated $NH_4OH$ to glacial acetic acid was about 1.7 to 1.

The activated cotton swatch, and dilute aqueous hydrazine hydrate, were added to the $AgNO_3$ solution. After 10 minutes, the cotton swatch was removed.

The palladium deposited on the cotton swatch in the activation step catalyzed the reduction of the $Ag^+$ by the hydrazine hydrate, providing a partially oxidized layer of silver tightly and intimately bonded to the fibers of the cotton swatch. The swatch, which initially was white in color, now was dark gray. The dark gray color remained unchanged after several launderings.

While the invention has been described with respect to a limited number of embodiments, it will be appreciated that many variations, modifications and other applications of the invention may be made.

What is claimed is:

1. A method for providing an acaricidal article, comprising the steps of:
    (a) providing a textile including fibers selected from the group consisting of natural fibers, synthetic cellulosic fibers, regenerated protein fibers, acrylic fibers, polyolefin fibers, polyurethane fibers, vinyl fibers, blends thereof, and
    (b) plating said fibers with a material selected from the group consisting of metals and metal oxides, wherein said plating is bonded directly to said fibers.

2. The method of claim 1, wherein the acaricidal article is a bedsheet.

3. The method of claim 1, wherein said plating is a metal.

4. The method of claim 1, wherein said providing of said textile in said acaricidal article is effected by steps comprising spinning said fibers to form a yarn.

5. The method of claim 4, wherein said providing of said textile in said acaricidal article is effected by steps comprising incorporating said yarn in a fabric.

6. The method of claim 5, wherein said yarn is incorporated in said fabric by weaving.

7. The method of claim 5, wherein said yarn is incorporated in said fabric by knitting.

8. An acaricidal article of manufacture comprising a metallized textile, said metallized textile including:
  (a) a textile including fibers selected from the group consisting of natural fibers, synthetic cellulosic fibers, regenerated protein fibers, acrylic fibers, polyolefin fibers, polyurethane fibers, vinyl fibers, and blends thereof; and
  (b) a plating including materials selected from the group consisting of metals and metal oxides, said plating being bonded directly to said fibers.

9. The article of manufacture of claim 8, wherein said article of manufacture is a bedsheet.

10. The article of manufacture of claim 8, wherein said plating is a metal.

11. An acaricidal bedsheet comprising a metallized textile, said metallized textile including:
  (a) a textile including fibers selected from the group consisting of natural fibers, synthetic cellulosic fibers, regenerated protein fibers, acrylic fibers, polyolefin fibers, polyurethane fibers, vinyl fibers, and blends thereof; and
  (b) a plating including materials selected from the group consisting of metals and metal oxides, said plating being bonded directly to said fibers.

* * * * *